(12) United States Patent
Wollmershauser et al.

(10) Patent No.: US 9,473,806 B2
(45) Date of Patent: *Oct. 18, 2016

(54) METHOD AND APPARATUS FOR SENDING STORED ADVERTISING DATA FROM AN INTERNET PROTOCOL TELEVISION END USER NETWORK INTERFACE DEVICE

(71) Applicant: AT&T Intellectual Property I, LP, Atlanta, GA (US)

(72) Inventors: Steven M Wollmershauser, San Antonio, TX (US); William R Hurst, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,052

(22) Filed: Nov. 18, 2015

(65) Prior Publication Data

US 2016/0219321 A1 Jul. 28, 2016

Related U.S. Application Data

(63) Continuation of application No. 14/331,922, filed on Jul. 15, 2014, now Pat. No. 9,215,418, and a continuation of application No. 11/509,322, filed on Aug. 24, 2006, now Pat. No. 8,789,078.

(51) Int. Cl.
| | |
|---|---|
| *H04N 21/2668* | (2011.01) |
| *H04N 21/81* | (2011.01) |
| *H04N 21/231* | (2011.01) |
| *H04N 21/258* | (2011.01) |
| *H04N 21/232* | (2011.01) |
| *H04N 21/858* | (2011.01) |
| *H04N 21/643* | (2011.01) |
| *H04N 21/262* | (2011.01) |

(52) U.S. Cl.
CPC ........ *H04N 21/2668* (2013.01); *H04N 21/232* (2013.01); *H04N 21/23106* (2013.01); *H04N 21/25816* (2013.01); *H04N 21/26225* (2013.01); *H04N 21/64322* (2013.01); *H04N 21/812* (2013.01); *H04N 21/8586* (2013.01)

(58) Field of Classification Search
CPC ................................. H04N 21/26225
USPC ....................................... 725/9, 14
See application file for complete search history.

(56) References Cited

U.S. PATENT DOCUMENTS 5,233,423 A * 8/1993 Jernigan ............ H04N 5/44504
348/564
5,667,440 A * 9/1997 Sasaki ..................... A63F 13/12
348/E7.07

(Continued)

*Primary Examiner* — Olugbenga Idowu
(74) *Attorney, Agent, or Firm* — G. Michael Roebuck, PC (57) ABSTRACT

A method and system are disclosed for sending stored IPTV advertisement data from an IPTV network end user network interface device, the method including but not limited to intercepting data from the end user device connected to the end user network interface device before the data reaches a destination intended by an end user associated with the end user device; determining at the end user network interface device whether a television subscription is active for the end user network device; and sending the advertisement data from the television network device to the end user device for display when the television subscription is not active for the network interface device and instructions to connect the client device to a walled garden indicated by a uniform resource in the advertisement data.

17 Claims, 5 Drawing Sheets

---

To experience
IP Television
just call 1-800-IPT-ELEV

- TV Ala-cart
- Movies
- Sports
- The most HDTV programming
- High-Speed Internet Access
- Wireless Mobile Phone Service
- Call now for free installation

(56) References Cited

U.S. PATENT DOCUMENTS

| | | | | |
|---|---|---|---|---|
| 5,825,407 A | * | 10/1998 | Cowe | H04H 20/103 348/485 |
| 5,890,137 A | * | 3/1999 | Koreeda | G06Q 20/02 705/24 |
| 6,018,768 A | * | 1/2000 | Ullman | H04L 29/06 348/E7.024 |
| 6,275,268 B1 | * | 8/2001 | Ellis | A63F 13/12 348/564 |
| 6,698,020 B1 | * | 2/2004 | Zigmond | H04N 5/44513 348/E5.102 |
| 7,133,051 B2 | * | 11/2006 | Sloo | H04N 5/44504 345/629 |
| 7,665,130 B2 | * | 2/2010 | Johnston | H04L 63/08 726/12 |
| 7,958,524 B2 | * | 6/2011 | Juneau | H04L 63/1408 725/104 |
| 2002/0062250 A1 | * | 5/2002 | Nagano | G06Q 30/02 705/14.25 |

\* cited by examiner

To experience
IP Television
just call 1-800-IPT-ELEV

- TV Ala-cart
- Movies
- Sports
- The most HDTV programming
- High-Speed Internet Access
- Wireless Mobile Phone Service
- Call now for free installation

METHOD AND APPARATUS FOR SENDING STORED ADVERTISING DATA FROM AN INTERNET PROTOCOL TELEVISION END USER NETWORK INTERFACE DEVICE

CROSS REFERENCE TO RELATED APPLICATION

This patent application is a continuation of U.S. patent application Ser. No. 11/509,322 filed on entitled A Method and Apparatus for Sending Stored Advertising Data from An Internet Protocol Television End User Network Interface Device filed on Aug. 24, 2006, which is hereby incorporated herein by reference in its entirety and also is a continuation of U.S. patent application Ser. No. 14/331,922 filed on entitled A Method and Apparatus for Sending Stored Advertising Data from An Internet Protocol Television End User Network Interface Device filed on Jul. 15, 2014, which is also hereby incorporated herein by reference in its entirety.

FIELD OF THE DISCLOSURE

The present disclosure relates generally to internet protocol television.

BACKGROUND

There is a great deal of competition for viewers in the new age of television. The old commercial-based national networks, which are free and generate revenues by selling broadcast advertising, are being supplanted by fee-based television services such as those provided by cable companies. The new television providers are subscription-based and generate a large part of their revenue by charging a subscription fee for their services. The subscription based television providers generally require a special cable connection or a wireless connection using a descrambler device to decode and view their television signal. Thus, unless a viewer has paid a fee to become a subscriber, the viewer cannot view the subscription-based television programs.

The subscription-based television providers deliver special programming previously unavailable over the older commercial-based no-fee television networks. In the past television service providers such as cable companies have advertised to solicit subscriptions to their cable television services by numerous methods. These past methods include telemarketing, direct mail campaigns, new move-in packages to apartment complex inhabitants and even direct sales facilitated by sending out sales personnel to meet with and solicit potential subscribers to the television service.

DETAILED DESCRIPTION

An illustrative embodiment of the present disclosure provides an advertisement data insertion method and apparatus for receiving, storing and sending advertisement data from an IPTV system end user network interface to a customer's television or computer. In a particular embodiment a method for sending stored IPTV advertisement data from an IPTV network end user network interface device is disclosed. The method includes receiving the IPTV advertisement data from an IPTV network server at the IPTV end user network interface device; storing the IPTV advertisement data in a memory of the IPTV network end user network interface device; determining at the IPTV network end user network interface device whether an IPTV subscription is active for the IPTV network end user device; and sending the advertisement data from the IPTV network device to a client device for display when the IPTV subscription is not active for the IPTV network end user network interface device. In another aspect of a particular embodiment the advertisement data further includes loss of signal data. The method further includes sensing whether an IPTV data signal is present from the IPTV network at the IPTV end user network interface device when the IPTV subscription is active for the IPTV network end user network interface device and sending the IPTV advertisement data to a client device from the IPTV end user network interface device when the IPTV data signal is not present. In another aspect of a particular embodiment the method further includes receiving a signal from the IPTV network server indicating that the IPTV subscription is active for the IPTV end user network interface device. In another aspect of a particular embodiment the method further includes converting the stored IPTV advertisement data to a radio frequency advertisement signal and modulating the radio frequency advertisement signal to a predetermined frequency assigned to a particular television channel. In another aspect of a particular embodiment the method further includes converting the stored IPTV advertisement data to a digital television signal.

In another aspect of a particular embodiment the advertisement data is selected from the group consisting of uniform resonance locator (URL) data, still image data and moving video data. In another aspect of a particular embodiment the URL data indicates a walled garden served from the IPTV network server. The method further includes intercepting data from a client device connected to the end user network interface device and connecting the client device to the walled garden. In another aspect of a particular embodiment the method further includes obtaining an identifier from a user associated with end user network interface device and guiding the user through an automated subscription sign-up or registration procedure for a service selected from the group consisting of IPTV, Voice over IP and internet service. In another aspect of a particular embodiment the advertisement data is uniform resource locator (URL) data and the IPTV network end user network interface device delivers the URL data through a network connection to an end user client device.

In another particular embodiment a system for sending stored IPTV advertisement data from an IPTV network end user network interface device is disclosed. The system includes a processor coupled to a memory and a computer program stored in the memory for execution by the processor. The computer program includes instructions to receive the IPTV advertisement data from an IPTV network server at the IPTV end user network interface device, instructions to store the IPTV advertisement data in a memory of the IPTV network end user network interface device, instructions to determine at the IPTV network end user network interface device whether an IPTV subscription is active for the IPTV network end user device and instructions to send the advertisement data from the IPTV network device to a client device for display when the IPTV subscription is not active for the IPTV network end user network interface device.

In another aspect of a particular embodiment the advertisement data further includes loss of signal data. The computer program further includes instructions to sense whether an IPTV data signal is present from the IPTV network at the IPTV end user network interface device when the IPTV subscription is active for the IPTV network end user network interface device and send the IPTV data signal to a client device from the IPTV end user network interface device when the IPTV data signal is not present. In another aspect of a particular embodiment the computer program further includes instructions to receive a signal from the IPTV network server indicating that the IPTV subscription is active for the IPTV end user network interface device. In another aspect of a particular embodiment the computer program further includes instructions to convert the stored IPTV advertisement data to a radio frequency advertisement signal and instructions to modulate the radio frequency advertisement signal to a predetermined frequency assigned to a particular television channel. In another aspect of a particular embodiment the computer program further includes instructions to convert the advertising data to a digital television signal. In another aspect of a particular embodiment the particular television channel incurs insubstantial potential off air interference. In another aspect of a particular embodiment the advertisement data is selected from the group consisting of uniform resonance locator (URL) data, still image data and moving video data. In another particular embodiment sending further includes sending an analog radio frequency TV signal over an analog radio frequency TV channel and sending a digital TV signal over a digital TV signal. In another particular embodiment the advertisement data is URL data indicating a uniform resource locator (URL) and the IPTV network end user network interface device delivers the URL data through a network connection to a client device. In another aspect of a particular embodiment the computer program further includes instructions to obtain an identifier from a user associated with a client device associated with the end user network interface device; and instructions to guide the user through an automated subscription for a service selected from the group consisting of IPTV, Voice over IP and internet service.

In another particular embodiment a computer readable medium containing a computer program for sending stored IPTV advertisement data from an IPTV network end user network interface device is disclosed. The computer program includes instructions to receive the IPTV advertisement data from an IPTV network server at the IPTV end user network interface device, instructions to store the IPTV advertisement data in a memory of the IPTV network end user network interface device, instructions to determine at the IPTV network end user network interface device whether an IPTV subscription is active for the IPTV network end user device and instructions to send the advertisement data from the IPTV network device to a client device for display when the IPTV subscription is not active for the IPTV network end user network interface device. In another aspect of a particular embodiment the advertisement data further including loss of signal data, the computer program further including instructions to sense whether an IPTV data signal is present from the IPTV network at the IPTV end user network interface device when the IPTV subscription is active for the IPTV network end user network interface device and instructions to send the IPTV advertisement data to a client device from the IPTV end user network interface device when the IPTV data signal is not present. In another aspect of a particular embodiment the computer program further includes instructions to receive a signal from the IPTV network server indicating that the IPTV subscription is active for the IPTV end user network interface device. In another aspect of a particular embodiment the assigned channel incurs insubstantial potential off air interference. In another aspect of a particular embodiment the advertisement data is selected from the group consisting uniform resonance locator (URL) data, still image data and moving video data. In another aspect of a particular embodiment the instructions to send further include instructions to send an analog TV signal over an analog TV channel and instructions to send a digital TV signal over a digital TV signal. In another aspect of a particular embodiment the advertisement data further includes URL data and the IPTV network end user network interface device delivers the URL data through a network connection to a client device.

In a particular illustrative embodiment, the IPTV end user interface is an intelligent network interface device (INID) that defaults to send the advertising data in analog and digital format over radio frequency selected channels, e.g., channels 3 and 3.1. The advertising data is sent from the INID to the residence over the in-house coaxial cable or network connections for display on home television sets. Thus, when a new potential IPTV customer moves into a home having an existing INID and connects their television to the home coaxial cable connected to the INID, picture data or video data will appear on at least a single analog or digital channel over the coaxial cable. In the illustrative embodiment, the channels selected for this advertising are channels that have insubstantial potential off-air interference, for example, National Television Standards Committee (NTSC) channels 3 and Advanced Television Systems Committee (ATSC) 3.1 or as set by a marketing agreement.

The default advertisement data is stored in memory in an IPTV network end user network interface device. In an illustrative embodiment the INID is used as the end user interface to the IPTV network. When a former IPTV network subscriber associated with an INID discontinues their IPTV service, the stored advertisement data at the INID is activated on an assigned television channel. The stored advertisement data can be activated and sent from the INID to a client device in the home by a switching signal from the IPTV service provider (SP) via and IPTV server, indicating that the IPTV subscription has been discontinued. The stored advertisement data can also be activated and sent automatically from the INID to a client device when a loss of the IPTV network signal is detected at the INID. Different advertisement data can be displayed depending on whether the IPTV signal is merely lost temporarily during an IPTV subscription ("temporary signal loss" message) or when the IPTV subscription has been discontinued ("sign up to purchase IPTV subscription" message).

If an IPTV customer moves out and discontinues IPTV service, the IPTV customer leaves the coax connected to the INID, the new potential IPTV customer would then connect their TV to the housing coax and would see a stored video or picture advertisement data sent from the INID promoting IPTV along with other services such as Voice over IP (VoIP) and internet services. If the subscriber terminates IPTV service and switches to another video provider, the new video provider usually disconnects the housing coax entering the house from the IPTV INID and connects the housing coax to the new service provider's video data feed, thus preventing the stored IPTV advertisement from being viewed on a display from the data presented on coax entering the house.

The received and stored advertisement data can be in the form of data representing a single picture requiring relatively low memory displaying a number to call for IPTV services or the advertisement data could be a full motion video clip requiring more memory that displays full motion high quality advertisement data in standard definition or high definition for IPTV services. The advertisement data can be downloaded from the IPTV network server and/or stored in a nonvolatile read only memory (ROM).

In another particular embodiment, in addition to the TV video display the INID advertising data can also be delivered through existing Cat 5 RJ45 connections already installed in the home. In an illustrative embodiment, the INID sends the same video data, URL data, or picture data over coax (hpna) and network connection, e.g., Ethernet, signaling to any home personal computer or wireless device that was connected before actual IPTV service is installed. This Ethernet signal provides the video advertisement data and/or instructions data on how to order IPTV services from an IPTV SP advertised from the stored INID data.

IPTV (Internet Protocol Television) describes a system where a digital television service is delivered using the Internet Protocol over a network infrastructure, which may include delivery by a broadband connection. For residential users, this type of service is often provided in conjunction with Video on Demand and may be part of combined Internet services such as Web access and VoIP, where it may then be called Triple Play, and is typically supplied by a broadband operator using a single infrastructure. In addition to the three services if voice, video and data, mobile service is also offered, it is called a Quad Play. In businesses IPTV may be used to deliver television content over corporate LAN's and business networks. Perhaps a simpler definition of IPTV would be television content that, instead of being delivered through traditional formats and cabling, is received by the viewer through the technologies used for computer networks.

IPTV video data is encoded in MPEG-4 format. MPEG-4 is an ISO/IEC standard developed by MPEG (Moving Picture Experts Group). MPEG-4 is the result of another international effort involving hundreds of researchers and engineers from all over the world. MPEG-4, with formal as its ISO/IEC designation 'ISO/IEC 14496', was finalized in October 1998 and became an International Standard in the first months of 1999. The fully backward compatible extensions under the title of MPEG-4 Version 2 were frozen at the end of 1999, to acquire the formal International Standard Status early in 2000. Several extensions were added since and work on some specific work-items work is still in progress. MPEG-4 builds on the proven success of three fields: Digital television; Interactive graphics applications (synthetic content); and Interactive multimedia (World Wide Web, distribution of and access to content).

The term set-top box (STB) describes a device that connects to a television and some external source of signal, and turns the signal into content then displayed on the screen. The signal source might be an Ethernet cable, a satellite dish, a coaxial cable, a telephone line (including DSL connections), or even an ordinary VHF or UHF antenna. Content, in this context, could mean any or all of video, audio, Internet web pages, interactive games, or other possibilities. A set-top box does not necessarily contain a tuner of its own.

Ethernet is a large and diverse family of frame-based computer networking technologies for local area networks (LANs). The name comes from the physical concept of the ether. It defines a number of wiring and signaling standards for the physical layer, two means of network access at the Media Access Control (MAC)/data link layer, and a common addressing format. Ethernet has been standardized as IEEE 802.3. Its star-topology, twisted pair wiring form became the most widespread LAN technology in use from the 1990s to the present, largely replacing competing LAN standards such as coaxial cable Ethernet, token ring, FDDI, and ARCNET. In recent years, WiFi, the wireless LAN standardized by IEEE 802.11, has been used in addition to or instead of Ethernet in many installations.

Figure 1:
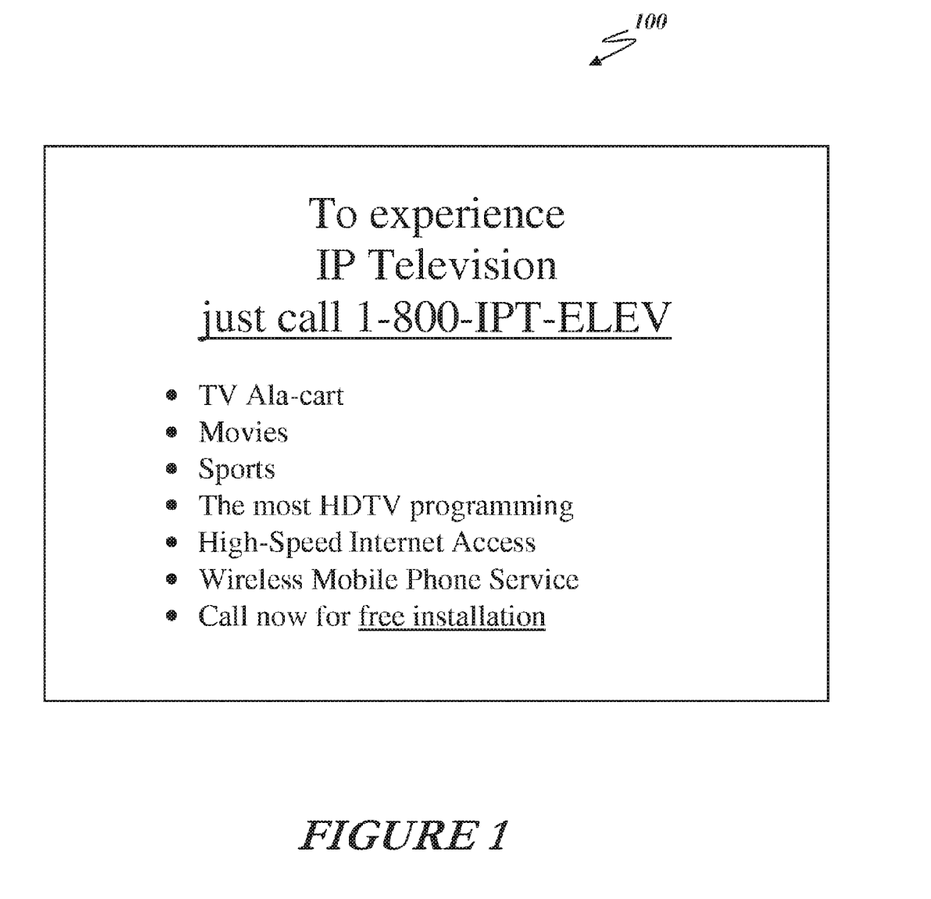
FIG. 1 depicts an illustrative embodiment of an advertisement promoting IPTV along with other services.

FIG. 1 depicts a display of advertising data promoting IPTV along with other services. The advertising data can be a single picture, video or a URL displayed on a television or computer display. The default advertisement data is stored in memory in the IPTV end user network interface device, for example, an INID. When a current IPTV subscriber terminates their IPTV service from the IPTV network this stored TV advertisement data is activated on the assigned channels. If the customer were switching to another video provider, the new provider would take over the coax preventing the advertisement data from being displayed. If the subscriber moves out, the new potential IPTV subscriber would then connect their TV to the home coax or network connection and would see and hear video or picture and audio or a URL advertisement data promoting IPTV along with other services.

Figure 2:
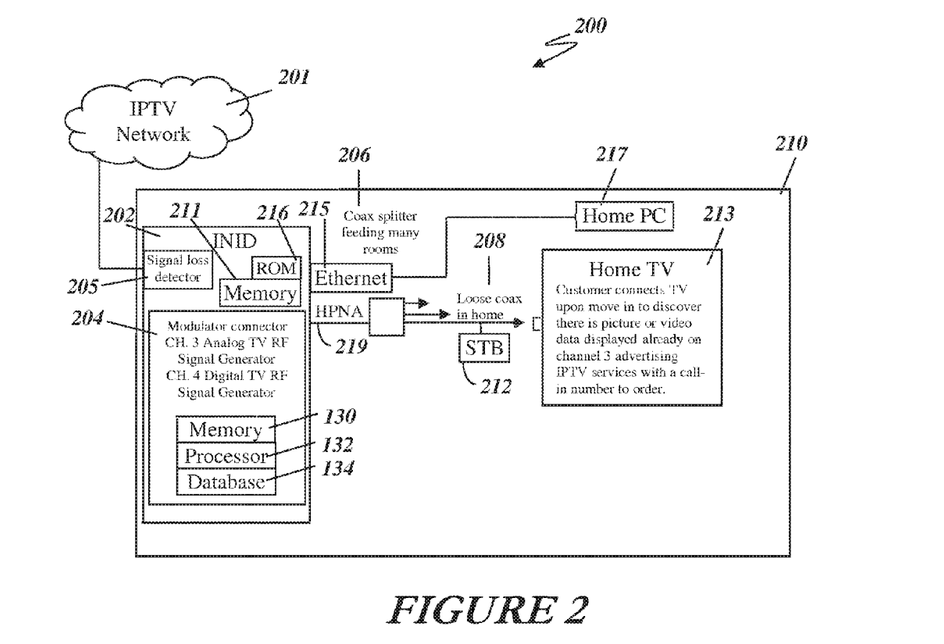
FIG. 2 is a diagram depicting an illustrative embodiment of the connection of new services for a new customer.

Turning now to FIG. 2, in an illustrative embodiment an IPTV network 201 server sends advertisement data including but not limited to URL data, video data or picture data to the INID 202. The advertisement data can also be supplied from read only memory (ROM) 216. The INID 202 stores the received advertisement data in memory 211. When an IPTV subscription is not active for a particular INID or an IPTV signal temporarily is lost at the particular INID, the INID 202 converts the picture data or video data to selected channel frequencies (for example, channels 3 and 3.1) using modulators 204 (one for ATSC and one for NTSC). The INID includes a processor 130 coupled to a memory 132 and a database stored in the memory 134. In an illustrative embodiment channel 3 is used for analog data and channel 3.1 used for digital data.

Modulators 204 are internet protocol to analog and digital converters which convert the incoming IPTV advertisement data signal to analog and digital TV signals suitable for display on analog TV channel 3 and digital TV channel 3.1 of an analog and digital television, respectively. The modulators 204 feed the signal to coax splitter 206 in the home which feeds the televisions inside of the residence. Coax in the home 208 connects to individual television sets 213 inside the home 210. When a customer connects the television to the loose coax 208 in the home the customer will view on channel 3 or 3.1 as selected by the INID modulator an advertisement video displaying a still picture or a motion video picture of the data supplied by the IPTV network. The IPTV network advertisement data will advertise IPTV services and also provide contact information for ordering the IPTV services.

When an IPTV subscription is active for the INID and there is no temporary loss of IPTV data signal from the IPTV network, the INID retransmits the IPTV signal as received from the IPTV network server to the coax splitter 206 at the residence. The IPTV network SP sends a message to the INID to indicate when a subscription for the INID has been terminated or when a temporary loss of signal at the INID is incurred. The INID may also sense a loss of incoming IPTV signal from the IPTV network and retrieve the default advertising data stored in the INID memory, modulate the data and send the modulated data as an analog and digital signals over the housing coax over channels 3 and 3.1 respectively.

The advertisement data can be sent over wireless, 802.11x, etc. or the housing coax using any acceptable format including but not limited to, HPNA Home Phone Line Networking Alliance (over coax & twisted pair) and MoCA (over coax only). The Multimedia over Coax Alliance (MoCA® for short) has been formed as a non-profit mutual benefit corporation to develop and promote specifications for the transport of digital entertainment and information content over in-home coaxial cable. The goal of MoCA is to create specifications and certify products that will tap into the vast amounts of unused bandwidth available on the in-home coax without the need for new connections, wiring, and point of entry devices or truck rolls. It is anticipated that the first MoCA enabled products will be released within the next year.

More than 70% of homes in the United States have coax already installed into the home infrastructure. Many have existing coax in one or more primary entertainment consumption locations such as family rooms, media rooms and master bedrooms—ideal for deploying networks. MoCA technology allows homeowners to utilize this infrastructure as a networking system and to deliver other entertainment and information programming with high QoS.

The technology underlying MoCA provides the vital elements necessary to distribute DVD quality entertainment throughout the home—high speed (270 mbps), high quality of service (QoS), and the innate security of a shielded, wired connection combined with state of the art packet-level encryption. Coax is designed for carrying high bandwidth video. Today, it is regularly used to securely deliver millions of dollars of pay per view and premium video content on a daily basis. The MoCA network also can also be used as a backbone for multiple wireless access points used to extend the reach of wireless throughout a consumer's entire home.

Figure 3:
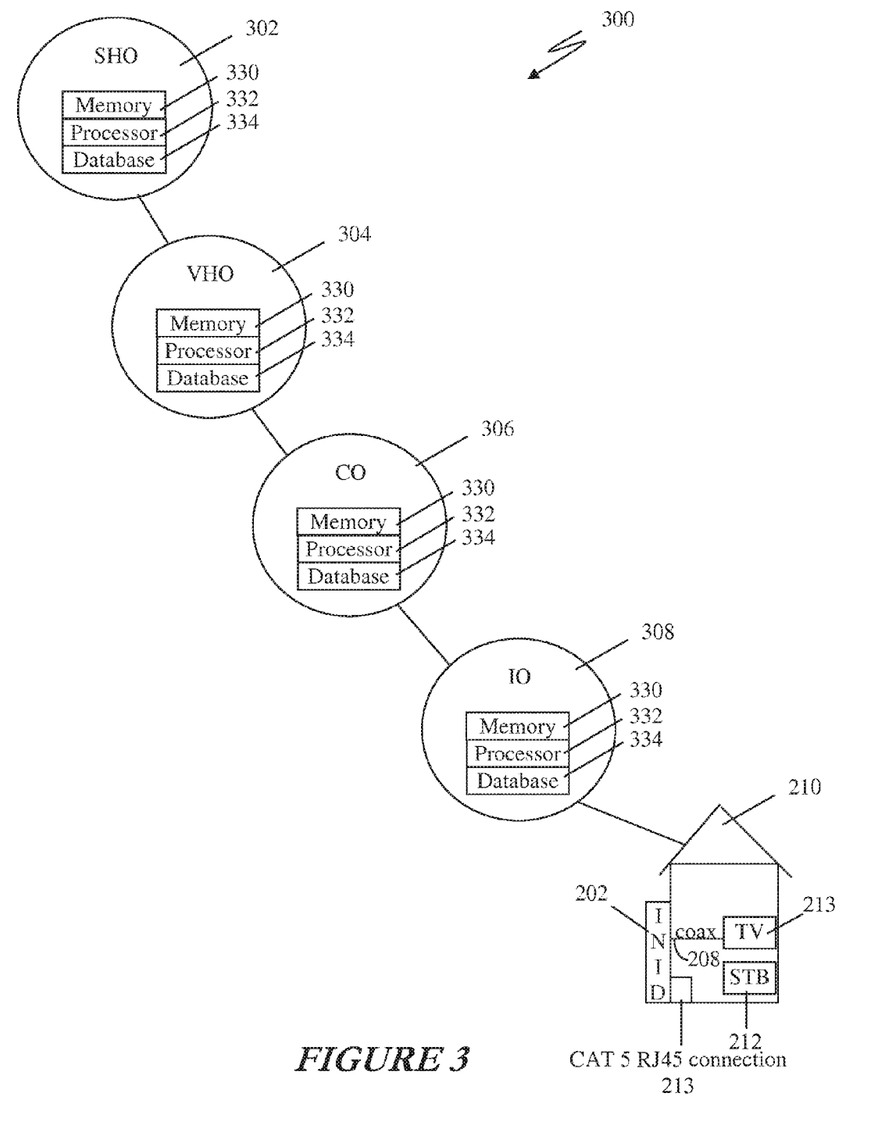
FIG. 3 depicts an illustrative embodiment of an IPTV system for delivering advertisement data to a IPTV end user interface to an IPTV system.

As shown in FIG. 3 in the IPTV network contains a multiplicity of servers/processors located at a super head end (SHO) 302, a video head end (VHO) 304, a central office (CO) 306, and an intermediate office (IO) 308 which in a hierarchal manner from the SHO down to the JO provide video data to IPTV subscribers such as the residence 210. Each SHO, VHO, CO and JO include a server/processor 330 coupled to a memory 332 and a database 334 in memory 332. The INID receives message data from the IPTV network indicating whether an INID has an associated active IPTV subscription and stores the message data in memory. The INID also includes a signal loss detection circuit 205 to determine whether the IPTV data signal from the IPTV network is lost or present. The IPTV network provides an IPTV data signal including the default advertisement data for storage in an INID 202 memory 211 adjacent the residence 210. As described in FIG. 2 the INID provides video data or picture data to a coax splitter 206 in the home which distributes the signal over the coax wiring throughout the home 208. When a set top box (STB) 212 is connected to the INID the IPTV signal is provided for all channels and the STB provides all channels to the coax wiring inside the home. The IPTV network can update the advertisement data at will so that even if the residence is unoccupied and no subscriber present the latest advertisement data can be sent to the INID for display when the next resident moves in to residence 210.

In another particular embodiment the INID redirects traffic to the designated URL containing the banner advertising when a potential subscriber accesses the residential network connected to the INID. The INID includes an IP server which supplies the URL for the computers connecting to the INID via wireless, Ethernet, HPNA, or MoCA. This INID IP server intercepts any attempt (for example, by monitoring port 80 traffic from the client computer) to log onto the Internet and can be designed to redirect the user to the URL being generated in the INID with the video. Another URL, which may be accessible and served from an IPTV network server, but in an illustrative embodiment is served from an IO sever. The URL serves as a "walled garden" of advertising data which can include but is not limited to video advertising data, and pictures. The walled garden URL includes but is not limited to video movies and programming that may be provided as free introductory offers such as free movies to a potential subscriber connected to the INID. The walled garden URL does not allow access to the rest of the Internet beyond the walled garden.

In another illustrative embodiment the walled garden requests an identifier from a user associated with the client device, e.g., an STB connected to the INID. The identifier includes but is not limited to a phone number or email address from the user associated with the INID. The user's identity can be derived from the email address or the phone number and provided as a quick sign-in and registration screen to populate a subscription registration screen with name, address, and personal information for a user/potential subscriber. The potential user/potential subscriber is offered services (IPTV, VoIP or internet services) for which they have not already subscribed. For example if a potential subscriber has Voice over IP (VoIP) service associated with the INID the walled garden can offer the Voice over IP subscriber IPTV service and internet service. If the potential subscriber associated with the INID has internet service the potential subscriber can be offered IPTV service and Voice over IP service.

Figure 4:
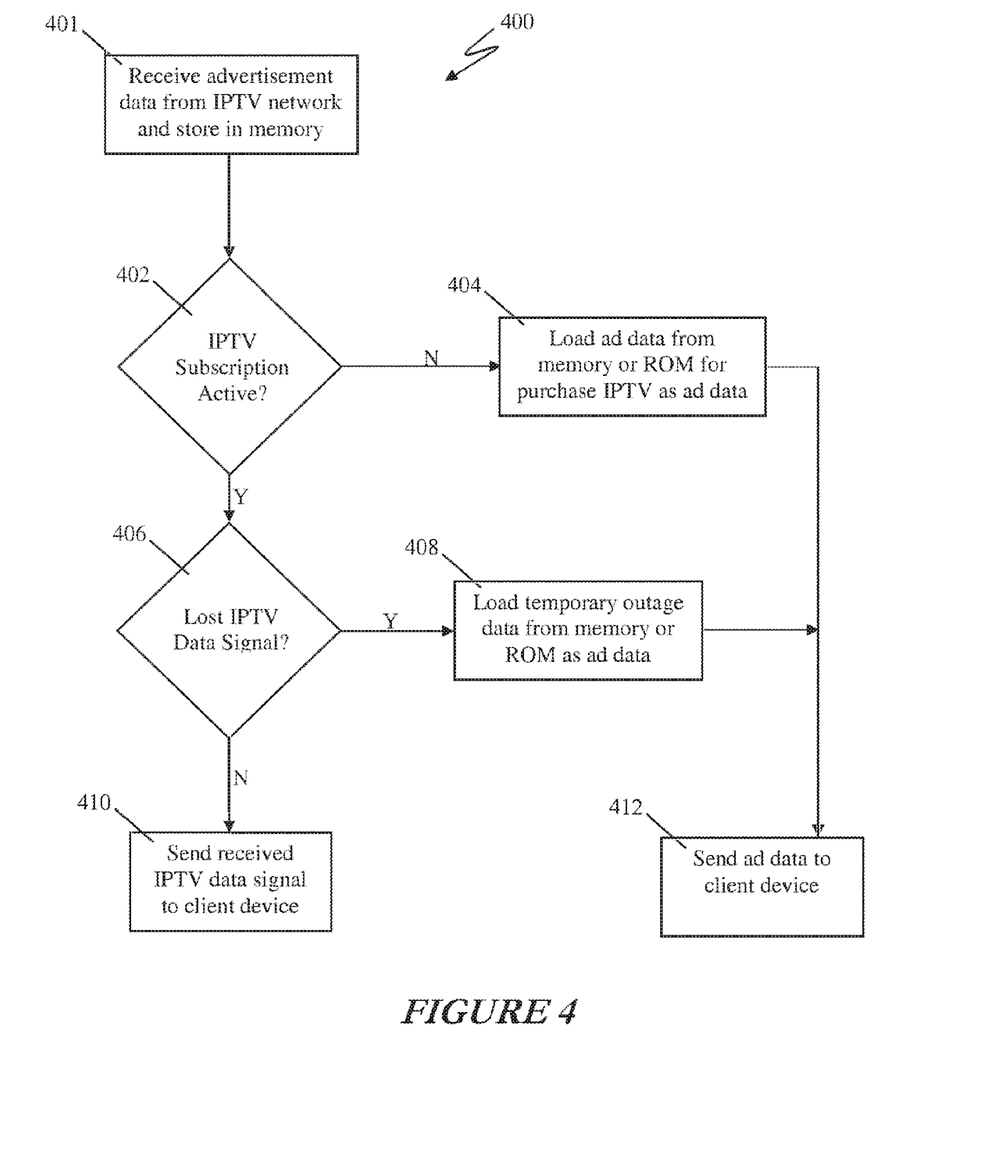
FIG. 4 is a flow chart depicting functions performed in an illustrative embodiment.

As shown in FIG. 4, in an illustrative embodiment the IPTV network end user network interface device receives the advertisement data from an IPTV network server and stores the data in memory at block 401. At block 402 the end user network interface device determines whether or not the subscription associated with the end user network interface device is active. If the subscription is not active the IPTV network end user network interface device (e.g., the INID) loads advertisement data from memory 130 or from ROM 216 for the purchase of IPTV subscription as the advertising data at block 404. The end user network interface device then sends the loaded advertisement data to the client device at block 412. If at block 402 the subscription is active then the end user network interface device determines at block 406 whether the IPTV data signal is lost or present. If the IPTV data signal is lost the end user network interface device proceeds to block 408 and loads the temporary outage data from memory or ROM as the advertising data. The end user network interface device then proceeds to block 412 and sends the loaded advertising data to the client device. If the end user network interface device determines that the IPTV data signal is present and a subscription is active the end user network interface device proceeds to block 410 and sends the received IPTV data signal to the client device.

Figure 5:
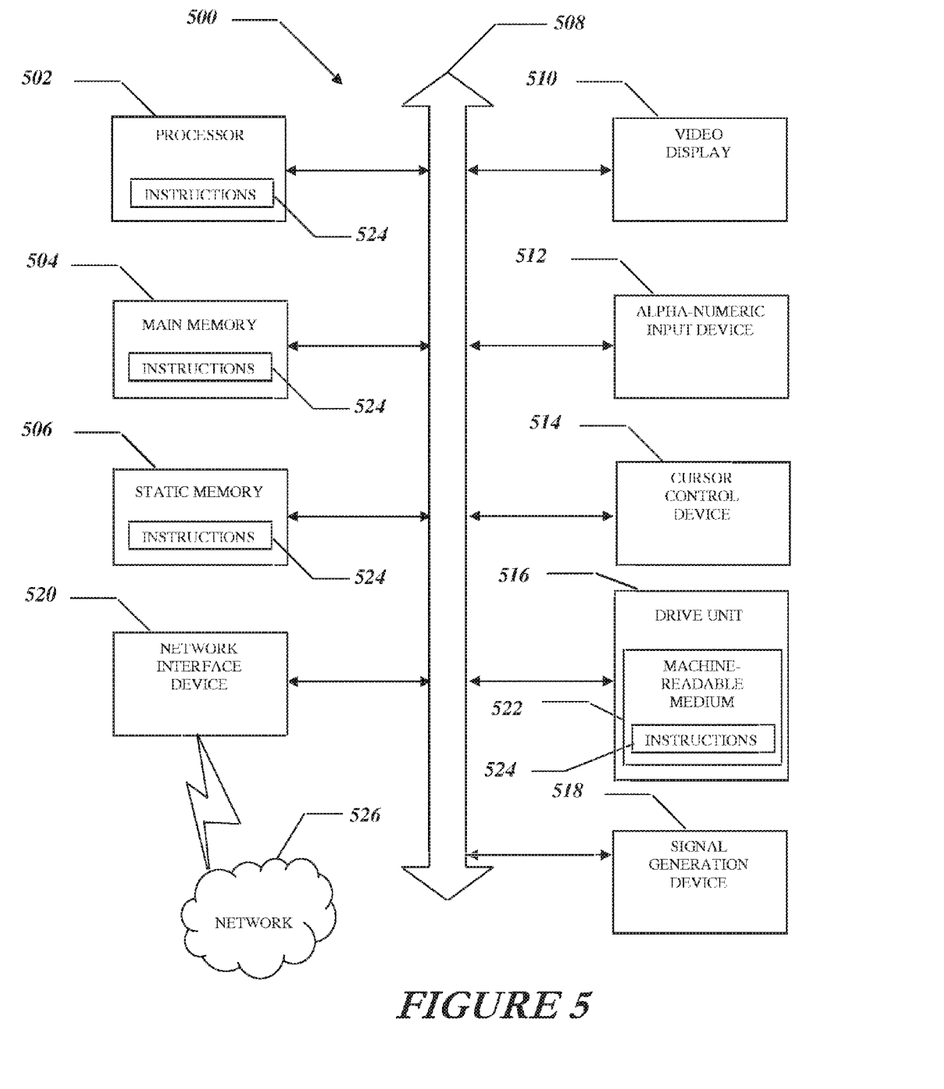
FIG. 5 is an illustrative embodiment of a machine for performing functions disclosed.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

In another illustrative embodiment a user can select a video or audio stream to be sent to an external audio or video device outside of the home via the IPTV network. In another illustrative embodiment a user can receive a video or audio from the house from a remote receiver or IP device and/or establish video or audio communication between the remote location and the audio and/or video devices in the home. In another illustrative embodiment motion detection on a camera sends alert to an STB of viewers with who a viewer wishes to communicate, alternatively email/SMS to additional device. In another illustrative embodiment, with management of available viewers at STBs and a buddy list to set up video sessions or audio with friends and neighbors. In another illustrative embodiment peer to peer video distribution "live broadcast" is provided.

In another illustrative embodiment a method for monitoring home remotely or controlling appliances in home via IPTV interface/portal is provided. Technologies to use are Zigbee, XIO, or RF remotes.

In another illustrative embodiment, IP-TV user interface is provided for that contains easy wizards to (1) identify Zigbee and RFID supported devices dynamically and incorporate functionality into the control interface, (2) let user set up X10 control codes for various appliances based on what she has configured in her home, (3) include smart remote capability to let user define other audio and/or video equipment in the home and where it is, so RF can be used to control other devices (and in this case the "closest" STB could be used to transfer the RF signals if it is with the other audio and/or video equipment to be controlled).

It should be noted that while an illustrative embodiment of this video distribution architecture can utilize a FTTN or FTTP broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for sending stored television advertisement data from an television network end user network interface device, the method comprising: intercepting data from the end user device connected to the end user network interface device before the data reaches a destination intended by an end user associated with the end user device;
   determining at the end user network interface device whether a television subscription is active for the end user network device;
   sending the advertisement data from the television network device to the end user device for display when the television subscription is not active for the network interface device and instructions to connect the client device to a walled garden indicated by a uniform resource in the advertisement data; and
   instructions to continuously provide from a local offline storage, prior to an end user device connecting to an online destination, preexisting default advertisement data from read only memory in the end user network interface device to the home network for display to any end user device.

2. The method of claim 1, wherein the advertisement data further comprises loss of signal data, the method further comprising:
   instructions to sense whether a television data signal is present from the television network at the television end user network interface device when the television subscription is active for the television network end user network interface device and sending the television advertisement data to a client device from the television end user network interface device when the television subscription is not active.

3. The method of claim 1, the method further comprising: continuously providing the default advertisement data over a radio frequency television channel from the end user network interface device for display by any end user device in a residence associated with the home network.

4. The method of claim 1, the method further comprising: receiving a signal from the television network server indicating that the television subscription is active for the television end user network interface device.

5. The method claim 1, the method further comprising: converting the stored television advertisement data to a radio frequency advertisement signal.

6. The method of claim 1, the method further comprising: modulating the radio frequency advertisement signal to a predetermined frequency assigned to a particular television channel.

7. The method of claim 1, the method further comprising: converting the stored television advertisement data to a digital television signal.

8. The method of claim 1, wherein the advertisement data is a uniform resonance locator data.

9. The method of claim 1, the method further comprising: obtaining an identifier from a user associated with end user network interface device; and
   guiding the user through an automated subscription registration for a service.

10. The method according to claim 1, wherein the advertisement data is uniform resource locator (URL) data and the television network end user network interface device delivers the URL data through a network connection to an end user client device.

11. A system comprising:
a processor in data communication with a tangible non-transitory computer readable medium; and
a first processor interface that intercepts data from the end user device connected to the end user network interface device before the data reaches a destination intended by an end user associated with the end user device;
a second processor interface that receives data to determine at the end user network interface device whether a television subscription is active for the end user network device;
a third processor interface that sends the advertisement data from the television network device to the end user device for display when the television subscription is not active for the network interface device and instructions to connect the client device to a walled garden indicated by a uniform resource in the advertisement data; and
a fourth processor interface that continuously provides from a local offline storage, prior to an end user device connecting to an online destination, preexisting default advertisement data from read only memory in the end user network interface device to the home network for display to any end user device.

12. The system of claim 11, wherein the advertisement data further comprises loss of signal data, the system further comprising: a fifth processor that senses whether a television data signal is present from the television network at the television end user network interface device when the television subscription is active for the television network end user network interface device and sending the television advertisement data to a client device from the television end user network interface device when the television subscription is not active.

13. The system of claim 11, the system further comprising:
a sixth processor that continuously provides the default advertisement data over a radio frequency television channel from the end user network interface device for display by any end user device in a residence associated with the home network.

14. The system of claim 11, the system further comprising:
a seventh processor interface that receives a signal from the television network server indicating that the television subscription is active for the television end user network interface device.

15. The system of claim 11, the system further comprising:
an eighth processor that receives data to convert the stored television advertisement data to a radio frequency advertisement signal.

16. The system of claim 11, the system further comprising:
a ninth processor that obtains an identifier from a user associated with end user network interface device; and
a tenth processor that sends data to guide the user through an automated subscription registration for a service.

17. The system according to claim 11, wherein the advertisement data is uniform resource locator data and the television network end user network interface device delivers the data through a network connection to an end user client device.

* * * * *